Figure 1:
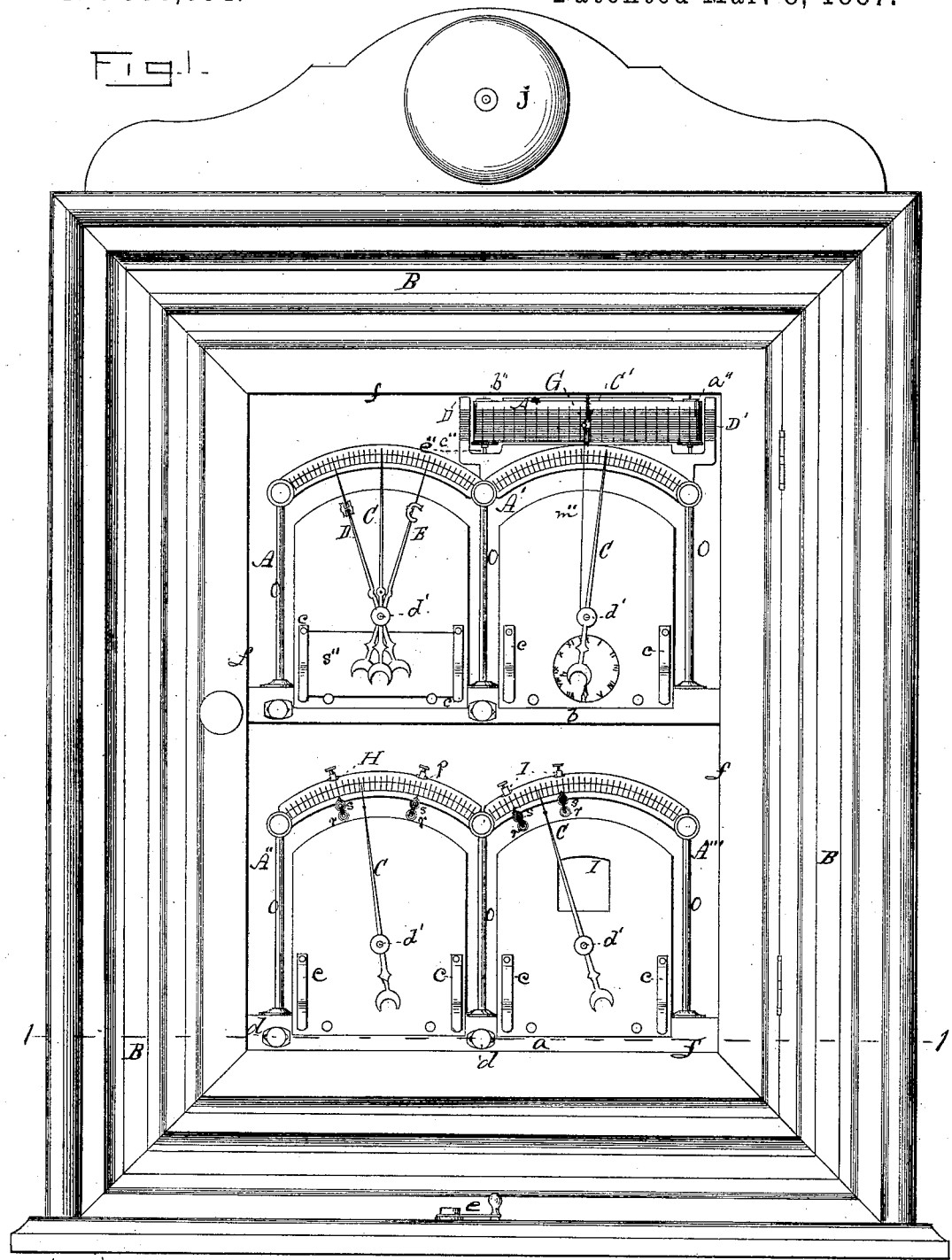

(No Model.) 18 Sheets—Sheet 1.
H. J. HAIGHT.
SELF SIGNALING AND SELF RECORDING ELECTRO MAGNETIC THERMOSCOPE.
No. 358,854. Patented Mar. 8, 1887.

WITNESSES:
Norris A. Clark.
Arthur S. Brown.

INVENTOR,
Henry J. Haight,
By his Attorney,
J. S. Brown.

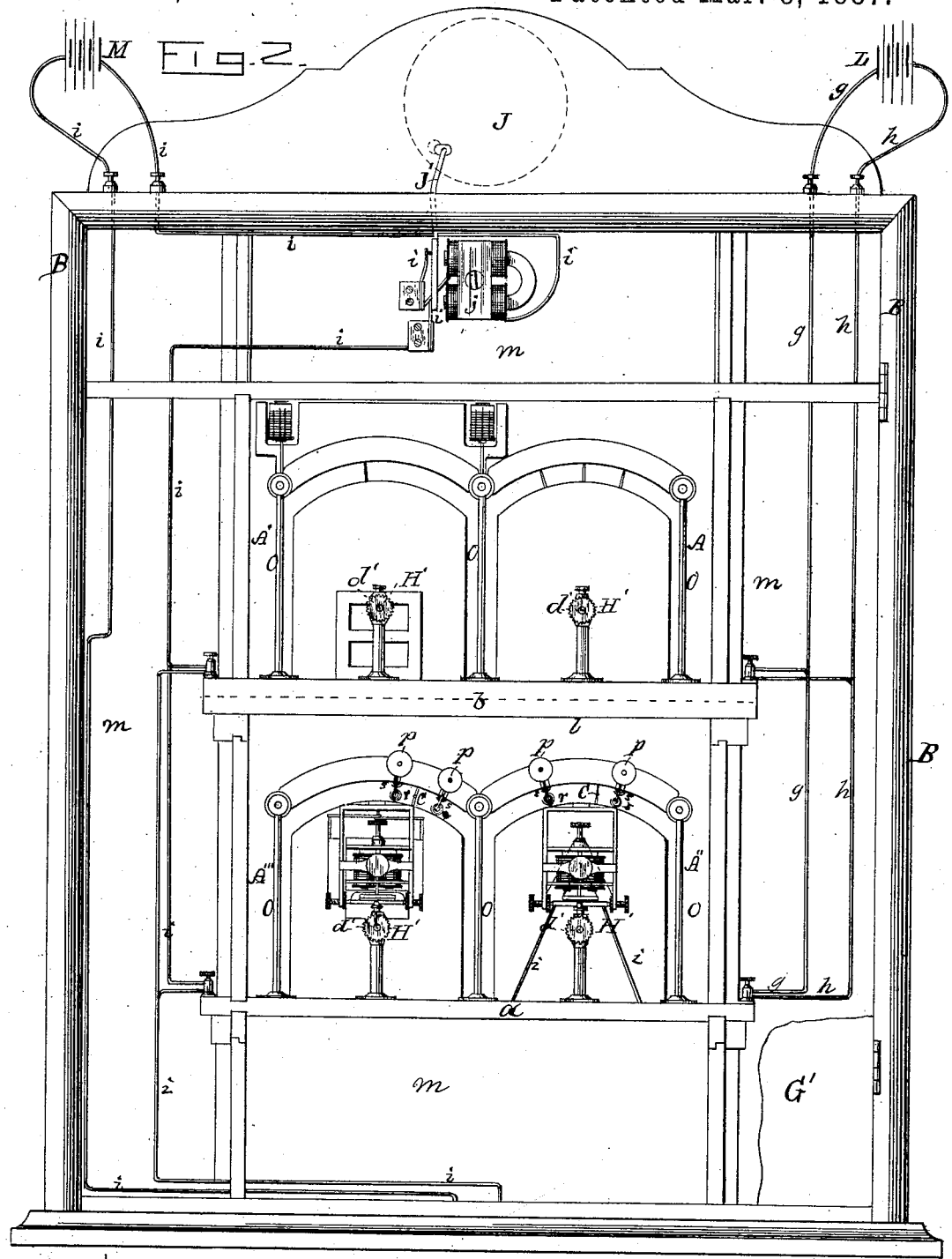

(No Model.) 18 Sheets—Sheet 3.
H. J. HAIGHT.
SELF SIGNALING AND SELF RECORDING ELECTRO MAGNETIC THERMOSCOPE.
No. 358,854. Patented Mar. 8, 1887.
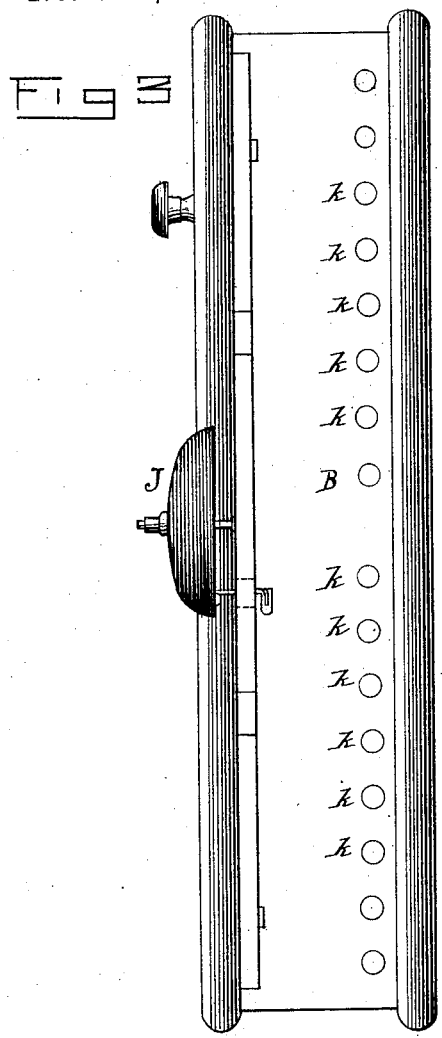
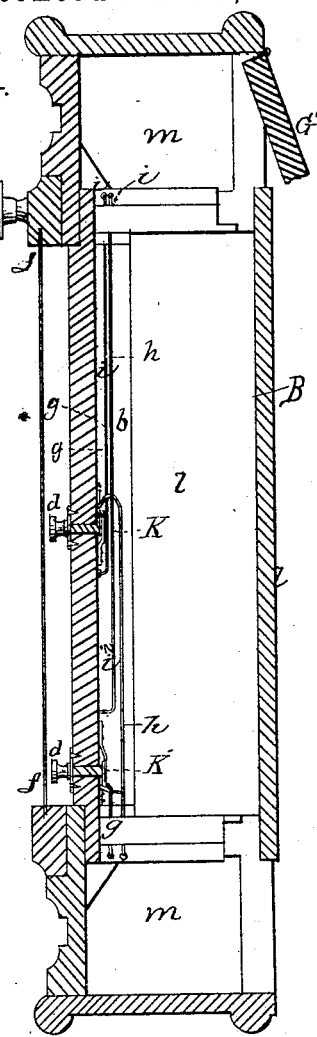
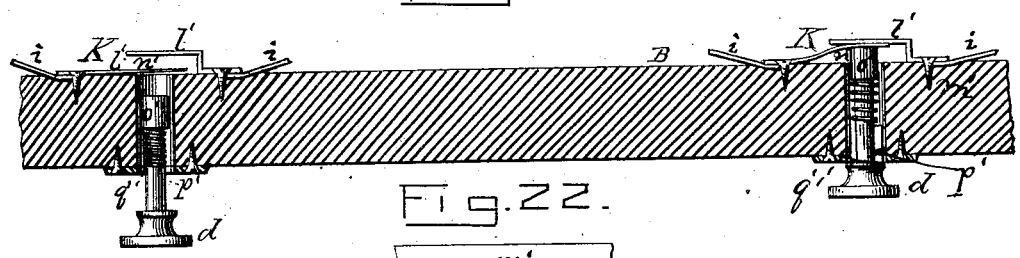
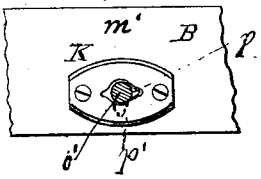
WITNESSES
Norris H. Clark.
Arthur S. Brown.
INVENTOR
Henry J. Haight
By his attorney,
J. S. Brown.

(No Model.)  18 Sheets—Sheet 4.
H. J. HAIGHT.
SELF SIGNALING AND SELF RECORDING ELECTRO MAGNETIC THERMOSCOPE.
No. 358,854. Patented Mar. 8, 1887.
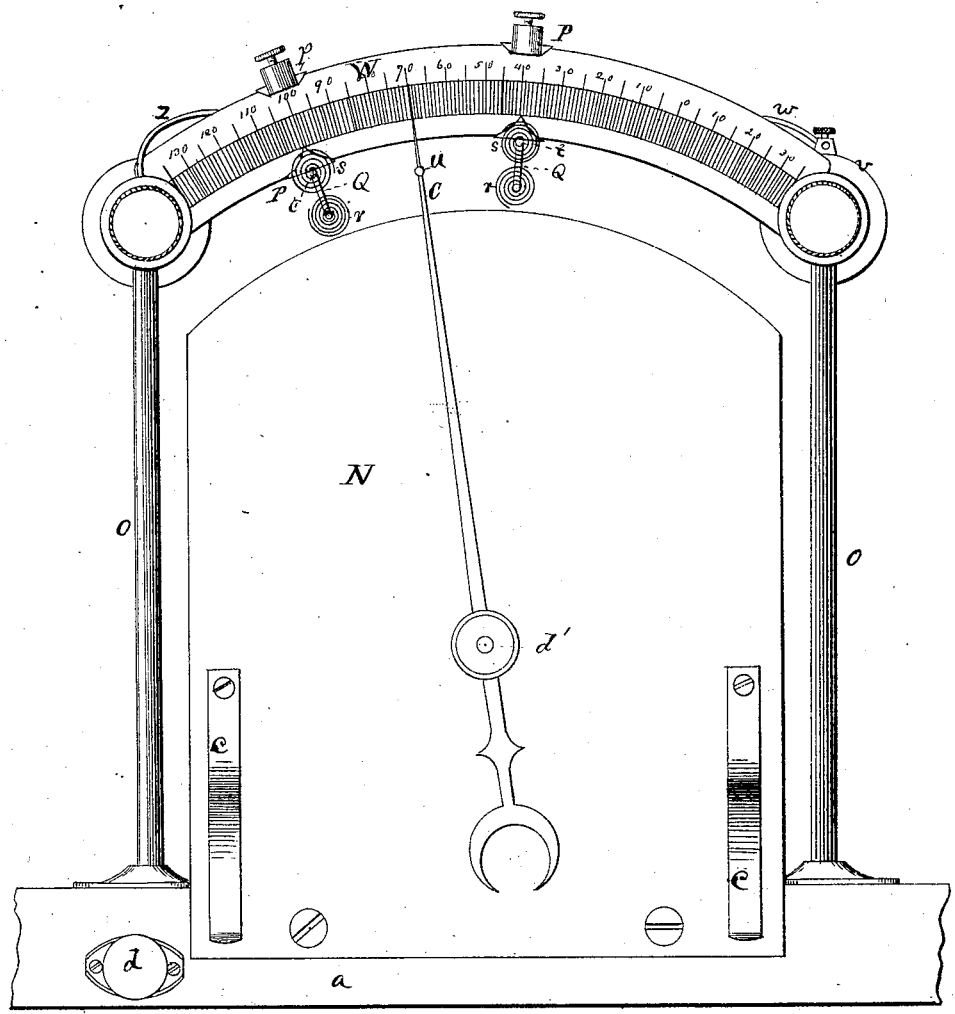
WITNESSES:
Norris A Clark
Arthur S. Brown.
INVENTOR
Henry J. Haight,
By his Attorney,
J. S. Brown.

(No Model.)   18 Sheets—Sheet 5.

H. J. HAIGHT.
SELF SIGNALING AND SELF RECORDING ELECTRO MAGNETIC THERMOSCOPE.

No. 358,854.   Patented Mar. 8, 1887.

(No Model.) 18 Sheets—Sheet 6.

H. J. HAIGHT.
SELF SIGNALING AND SELF RECORDING ELECTRO MAGNETIC THERMOSCOPE.

No. 358,854. Patented Mar. 8, 1887.

WITNESSES:
Norris A. Clark.
Arthur S. Brown.

INVENTOR:
Henry J. Haight,
By his attorney, (No Model.)  18 Sheets—Sheet 7.

H. J. HAIGHT.
SELF SIGNALING AND SELF RECORDING ELECTRO MAGNETIC THERMOSCOPE.

No. 358,854. Patented Mar. 8, 1887.

WITNESSES:
Norris H. Clark
Arthur S. Brown.

INVENTOR:
Henry J. Haight,
By his attorney,
A. S. Brown.

(No Model.) 18 Sheets—Sheet 8.

H. J. HAIGHT.
SELF SIGNALING AND SELF RECORDING ELECTRO MAGNETIC THERMOSCOPE.

No. 358,854. Patented Mar. 8, 1887.

WITNESSES:
Norris A. Clark
Arthur S. Brown

INVENTOR
Henry J. Haight
By his attorney,
J. S. Brown.

(No Model.) 18 Sheets—Sheet 10.
H. J. HAIGHT.
SELF SIGNALING AND SELF RECORDING ELECTRO MAGNETIC THERMOSCOPE.

No. 358,854. Patented Mar. 8, 1887.

WITNESSES:
Norris A. Clark.
Arthur S. Brown.

INVENTOR:
Henry J. Haight,
By his attorney,
J. S. Brown.

(No Model.) 18 Sheets—Sheet 12.
H. J. HAIGHT.
SELF SIGNALING AND SELF RECORDING ELECTRO MAGNETIC THERMOSCOPE.
No. 358,854. Patented Mar. 8, 1887.

WITNESSES:
Norris A. Clark.
Arthur S. Brown.

INVENTOR:
Henry J. Haight,
By his attorney
A. S. Brown.

(No Model.)  18 Sheets—Sheet 13.
H. J. HAIGHT.
SELF SIGNALING AND SELF RECORDING ELECTRO MAGNETIC THERMOSCOPE.

No. 358,854. Patented Mar. 8, 1887.

WITNESSES:
Norris A. Clark.
Arthur S. Brown.

INVENTOR:
Henry J. Haight,
By his attorney,
A. S. Brown.

(No Model.) 18 Sheets—Sheet 14.

H. J. HAIGHT.
SELF SIGNALING AND SELF RECORDING ELECTRO MAGNETIC THERMOSCOPE.

No. 358,854. Patented Mar. 8, 1887.

WITNESSES:
Norris A. Clark.
Arthur S. Brown.

INVENTOR
Henry J. Haight,
By his attorney,
J. S. Brown.

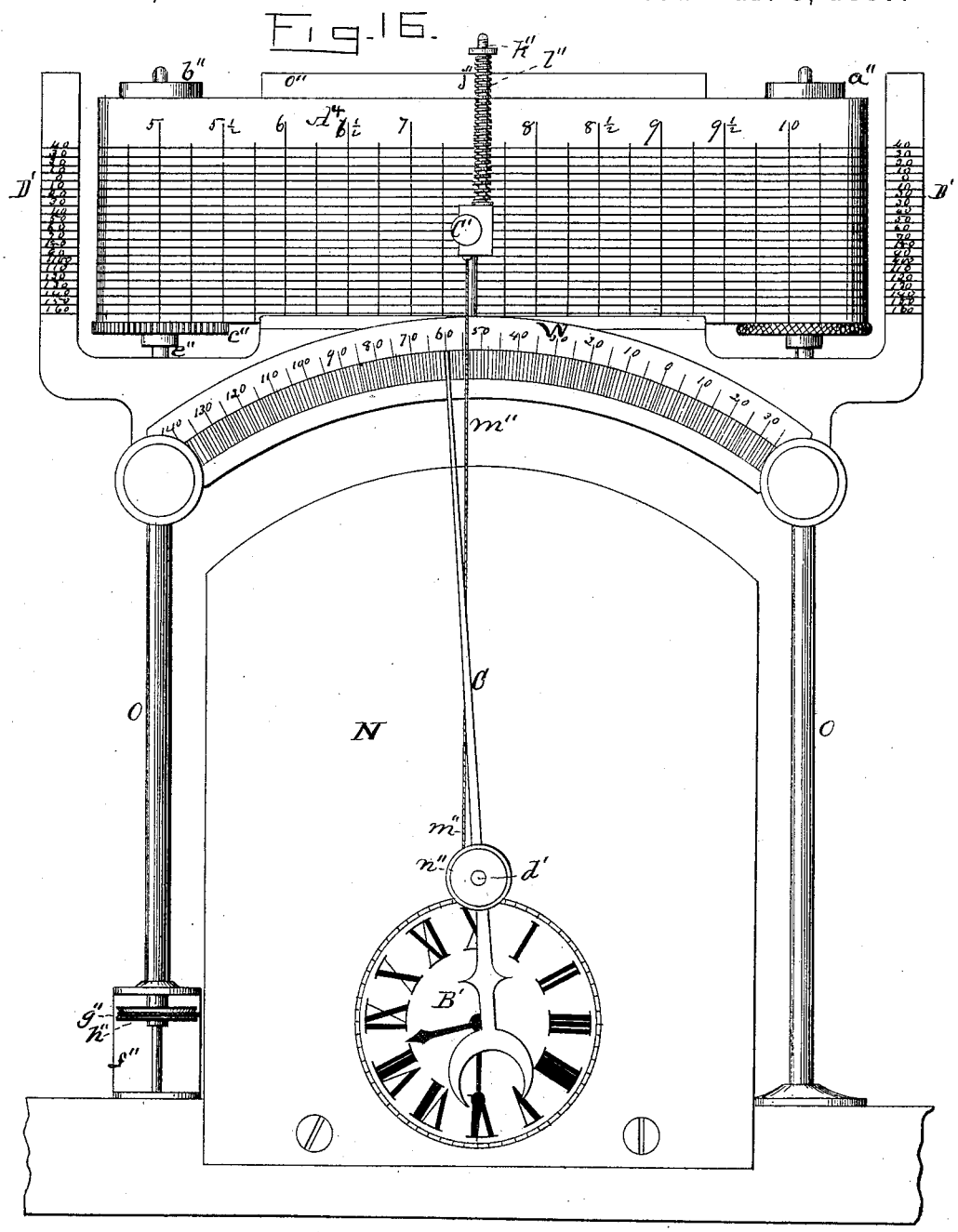

(No Model.) 18 Sheets—Sheet 16.
H. J. HAIGHT.
SELF SIGNALING AND SELF RECORDING ELECTRO MAGNETIC THERMOSCOPE.
No. 358,854. Patented Mar. 8, 1887.
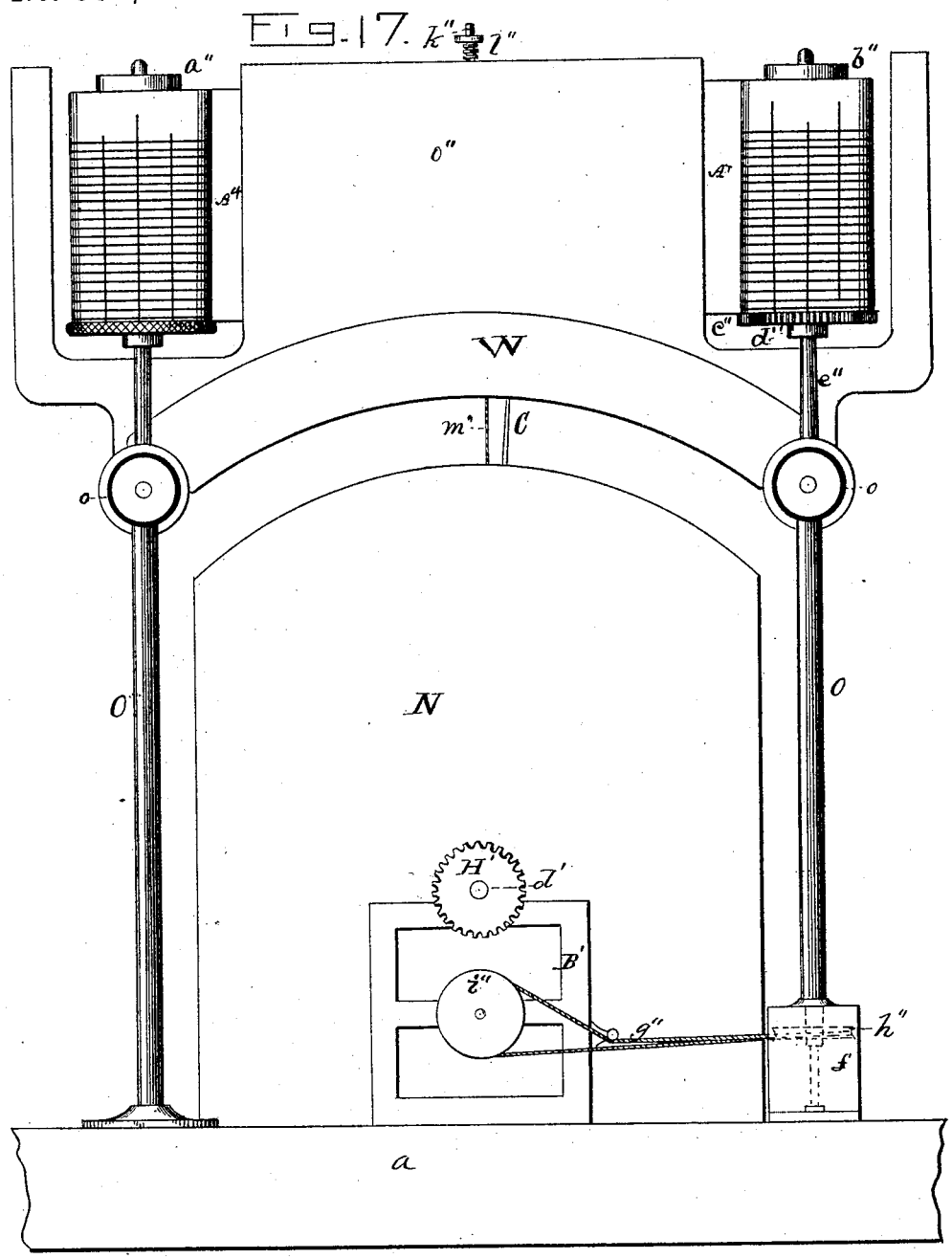
WITNESSES:
Norris A. Clark
Arthur S. Brown
INVENTOR
Henry J. Haight,
By his attorney,
J. S. Brown.

(No Model.)
H. J. HAIGHT.
SELF SIGNALING AND SELF RECORDING ELECTRO MAGNETIC THERMOSCOPE.
No. 358,854. Patented Mar. 8, 1887.
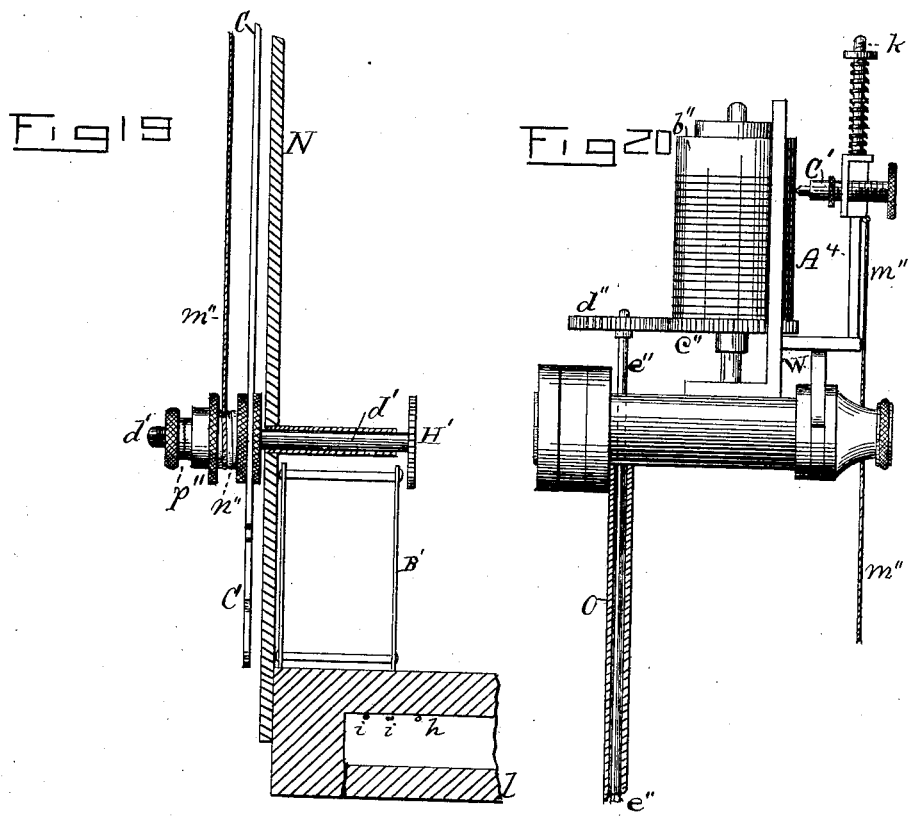
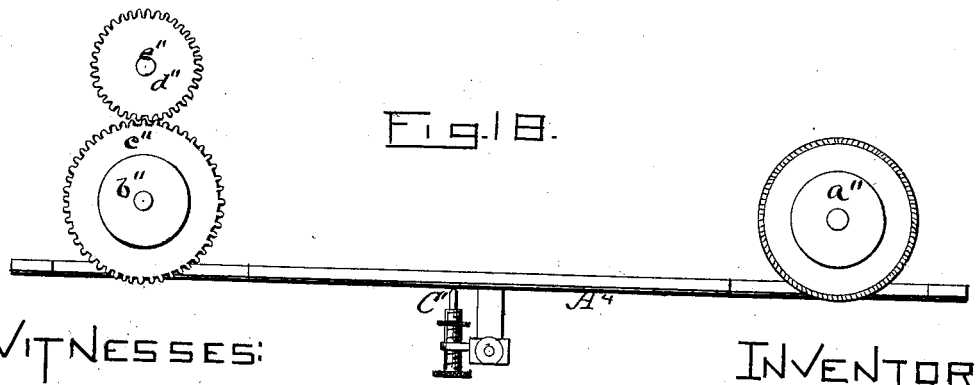

(No Model.) 18 Sheets—Sheet 18.
H. J. HAIGHT.
SELF SIGNALING AND SELF RECORDING ELECTRO MAGNETIC THERMOSCOPE.

No. 358,854. Patented Mar. 8, 1887.

UNITED STATES PATENT OFFICE.

HENRY J. HAIGHT, OF NEW YORK, N. Y.

SELF-SIGNALING AND SELF-RECORDING ELECTRO-MAGNETIC THERMOSCOPE.

SPECIFICATION forming part of Letters Patent No. 358,854, dated March 8, 1887.

Application filed May 13, 1885. Serial No. 165,314. (No model.)

*To all whom it may concern:*

Be it known that I, HENRY J. HAIGHT, of the city of New York, in the county of New York and State of New York, have invented a new and Improved Self-Alarm, Self-Signaling, and Self-Recording Electro-Magnetic Thermoscope; and I do hereby declare that the following is a full and exact description thereof, reference being had to the accompanying drawings, making part of this specification.

The purpose of my invention is to combine with an electro-magnetic thermoscope, which indicates the temperature of any given room or place at any required distance therefrom, means for sounding an alarm and for signaling to the sight, one or both, when either extreme of temperature, pre-established, or any given degree of temperature is reached at the transmitting room or place, and also for recording the limits or extremes as well as intermediate degrees of temperature of the said transmitting room or place at the receiving-station for subsequent inspection; and my invention consists, first, in the combination, with the receiving thermoscope or instrument of an electro-magnetic thermoscope, of a sound-alarm device brought into action thereby when any predetermined limit or degree of temperature has been reached at the transmitting room or place; second, in the combination, with such receiving-instrument, of a device for sight-signaling actuated thereby when the required limit or limits may have been reached at the transmitting room or place; third, in the combination, with such receiving-instrument, of a self-recording device actuated thereby to mark from hour to hour the variations of temperature at the transmitting room or place; fourth, in the combination in one apparatus of all of the self-alarm, self-signaling, and self-recording devices as applied to two or any greater number of receiving electro-magnetic thermoscopic instruments connected with as many distant rooms or places, each instrument having one, two, or all of such devices, according to the use of each instrument; and, fifth, in several specific devices, hereinafter set forth, auxiliary to the construction or conducive to the proper operation of the several main devices above specified.

In carrying out my present invention I preferably use an electro-magnetic thermoscope, such as set forth in Letters Patent No. 307,543, granted to me November 4, 1884, and I shall represent and describe my present improvements in connection with one or more of the receiving-thermoscopes specified in the said Letters Patent. The invention described therein, so far as transmitting to a distance a knowledge of the condition of the temperature at a given place is concerned, is confined to the simple sight-indication of the exact temperature at each special moment or particular time, and the observer must then be present or close at hand, so as to read the indication on the scale of the receiving-instrument. Such a thermoscope, however, is applicable to many and various uses, for some of which it is only necessary or desirable to thus indicate to the near observer at the moment of observation, while in other cases it may be necessary or desirable to sound an alarm to some one simply in the vicinity or within hearing of the receiving-instrument, whenever a certain limit of heat is reached, either the highest or the lowest desired, for the simple purpose of calling the attention of an attendant near by, but often out of sight of the instrument, and not necessarily requiring him to visit the instrument at all, but merely warning him to give some instructions to others or do some required act under the circumstances, whereas in other cases it may be necessary or preferable to signal to the sight only when such a limit of temperature has been reached, the attendant being supposed to be in sight of or in a proper position to inspect the instrument, it being of less importance in such cases to know immediately that the signal has been made than to know the purport of the signal, whether the highest or the lowest limit has been reached. Again, it may be important or desirable both to have a sound-alarm for instantly calling the attendant's attention to the instrument and a sight-signal to show what has been signaled, whether a too high or a too low temperature or simply when a suitable temperature has been reached, so that further heating or further cooling, as the case may be, may be arrested. Again, it may be of less importance to know at the time when a certain high or low limit or a given temperature may have been reached than to know subsequently what previous extremes have been reached or what the temperature has been during all of a given period of time, whether variable or constant. Finally, even all of the above-named points of observation or means of observation may be required or desired together—that is, sight-indication, sound-alarm, sight-signaling, and recording.

For examples of instances of such single and combined uses of the thermoscope as above enumerated, I may mention, first, a manufactory or other building heated by steam, wherein an engineer is constantly stationed. A simple receiving-thermoscope may be placed in the engine or boiler room, such as described in my aforesaid Letters Patent, and be sufficient, since the engineer is supposed to be always present to watch the simple indications of temperature in the room or rooms heated by the steam controlled by him and ready at all times to adapt the fire to the occasion; but, again, the keeper of a hot-house may not only want to know the temperature therein whenever he looks at his receiving-thermoscope, but especially at night may want to know by sound-alarm, calling immediate and unfailing attention thereto whenever the temperature is getting too low or too high. Then, again the engineer of the heating-room in a hospital having many wards or rooms requiring constant vigilance over all would find a series of sight-signals for the receiving-thermoscopes of the several wards or rooms to indicate the limits of required temperature important, while sound-alarms would be of little or no use.

Then, in the case of an observatory wherein the temperatures of different localities (some at great distances apart) may be indicated by thermoscopic transmission, it is principally important to record from hour to hour the temperatures of the several localities; and in other cases, such as with incubators, and wherever it may be injurious or fatal to go above or especially below certain limits of temperature, it may be very desirable to continually indicate the current temperature on the thermoscope-scale, to signal the extreme limits to the sight in the day-time, to sound alarm in the night-time when such limits are reached, and to record the temperature at all times for subsequent inspection, to see whether the place has been injuriously affected by too great cold or heat since the previous inspection. Finally, a series of receiving-thermoscopes may be grouped together, indicating temperatures from various places and for various purposes, some requiring one method of observation, some another, some two or more or even all the modes of observation and record, thus conveniently combining or uniting all in one compact apparatus.

Thus one purpose of my invention is to arrange in one compact case or frame, in groups or series or individually, electro-magnetic receiving-thermoscopes, each having one or more of the capabilities above set forth for all the purposes required in one locality.

Thus, in the accompanying drawings, Figure 1 represents a front view, Fig. 2 a rear view, Fig. 3 a top view, and Fig. 4 a horizontal section, looking upward, in a plane indicated by the line 1 1, Fig. 1, of a case containing four receiving electro-magnetic thermoscopes differently supplied as to the devices above enumerated and indicating a suitable means of combining any desired number of such thermoscopes compactly and conveniently.

In these figures are represented four receiving-thermoscopes, A A' A'' A''', arranged in a case, B, two being shown as placed upon a lower shelf or support, $a$, and two on an upper shelf or support, $b$. This arrangement will indicate a proper mode of grouping any greater number of thermoscopes. The thermoscope A is represented as simply an indicating-thermoscope, such as shown in my above-mentioned Letters Patent, having a current-temperature index, C, highest-temperature index D, and lowest-temperature index E. The thermoscope A' is shown as an indicating-thermoscope with a current-temperature index, C, and a self-recording device, G, combined therewith. The thermoscope A'' is represented as provided with a current-temperature index, C, and a sound-alarm device, H, combined therewith, for high and low temperature extremes. The thermoscope A''' is represented as provided with a current-temperature index, C, and a sight-signaling device, I, combined therewith, for high and low temperature extremes.

The bell or sounder J J' for the sound-alarm device is represented as being placed centrally at the top of the case B, but may be located in any other part of the case or frame where there is space for it. A single bell or sounder is sufficient for any number or all of the thermoscopes in a case. In the arrangement here shown, however, only one thermoscope is provided with a sound-alarm and connected with the bell or sounder, the object of the case and grouping shown being to illustrate all the different improvements of the present invention united in one arrangement. I show here, also, on the face of each thermoscope spring-clasps $c\ c$, each secured at its upper end to the face-plate, for holding removable and replaceable cards or slips of paper $s''$, (one being shown on thermoscope A,) on which may be noted any desired memoranda—such as the room or place containing the transmitting-thermoscope with which that particular receiving-thermoscope is electrically connected, or any particular temperature which one may choose to note thereon. Each thermoscope, also, has or may have a knob or bolt, $d$, connected with a circuit closer and breaker, K, of the construction shown in Figs. 21 and 22, or otherwise suitably constructed, whereby to connect or disconnect the alarm or signal device at will.

Where the sound-alarm is connected with two or more of the thermoscopes in one case or group, there is preferably a knob or key, e, Fig. 1, operating a general circuit closer and breaker for connecting or disconnecting all the alarms at once.

A glass door, f, shuts in and shields from dust and moisture all the thermoscopes and instruments or devices connected therewith, and still affords access to the front parts of the instruments at will. The case also has a rear door, G', as shown in Fig. 4, to gain access to the operating parts of the thermoscopes and the instruments combined therewith.

Fig. 2 represents a rear view of the thermoscopes constructed and arranged as those shown in Fig. 1, the rear door being shown swung aside. In this view I do not show the operative mechanism of the thermoscopes complete, since they form no part of the present invention; but I show the worm-wheel H' and index-shaft d', corresponding with the same parts as set forth in the said former Letters Patent, so that the connection of the present invention with the thermoscopes will be fully understood. In this view I show such operative parts as belong to the present invention relatively arranged in the case or holding-frame. I also indicate therein a local battery, L, Fig. 2, for actuating the sound-alarm and sight-signaling devices on their respective thermoscopes, and wires g h, for connecting the battery with the said thermoscopes, respectively. I likewise indicate a local battery, M, Fig. 2, for sounding the alarm bell or sounder J, and wires i i, connecting the battery with the bell-sounding magnet j.

In Fig. 3 is shown the alarm-bell and the binding-posts k k, for attaching the line-wires connecting the several receiving thermoscopes in the case with their respective transmitting-thermoscopes at any distances away.

In Fig. 4, which is a view looking upward under one of the shelves or tables which support the thermoscopes, I show a sliding lid, l, under the shelf, for gaining access to connecting-wires running along the lower side of the shelf, and then shielding the same by sliding beneath them. I show in Fig. 4 the lid partly drawn out to expose the wires to view.

I show in Fig. 2 a good and desirable construction of the case for the purpose of this invention. The shelf-compartments in which the thermoscopes are located occupy the central part of the case, and there are marginal compartments or spaces m m all around the thermoscopic compartments, in which the connecting-wires and their binding-posts are placed, whereby ready access is gained thereto without disturbing the thermoscopes or instruments combined therewith and without exposing the wires to view through the glass front of the case. In the upper marginal compartment is shown located the alarm-bell magnet j, and this is a convenient location therefor; but it may be located in some other compartment, if preferred.

Figure 6:
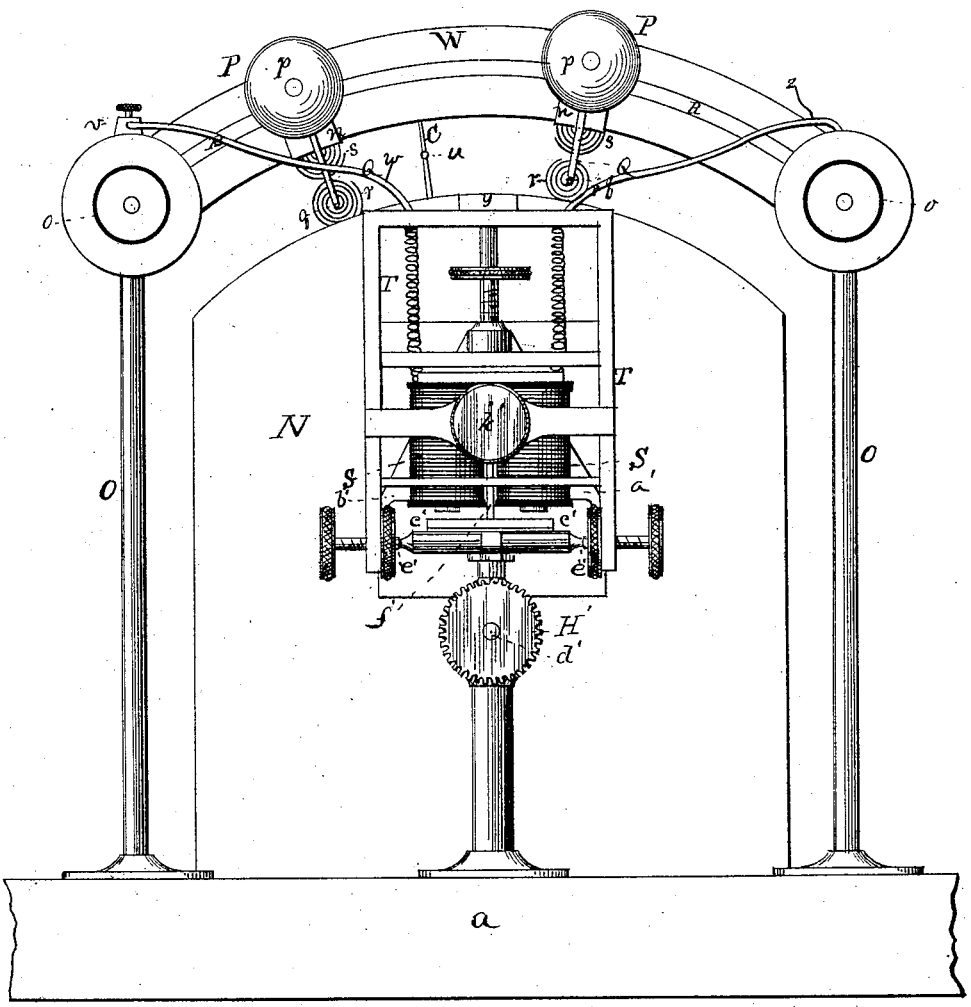
Figure 7:
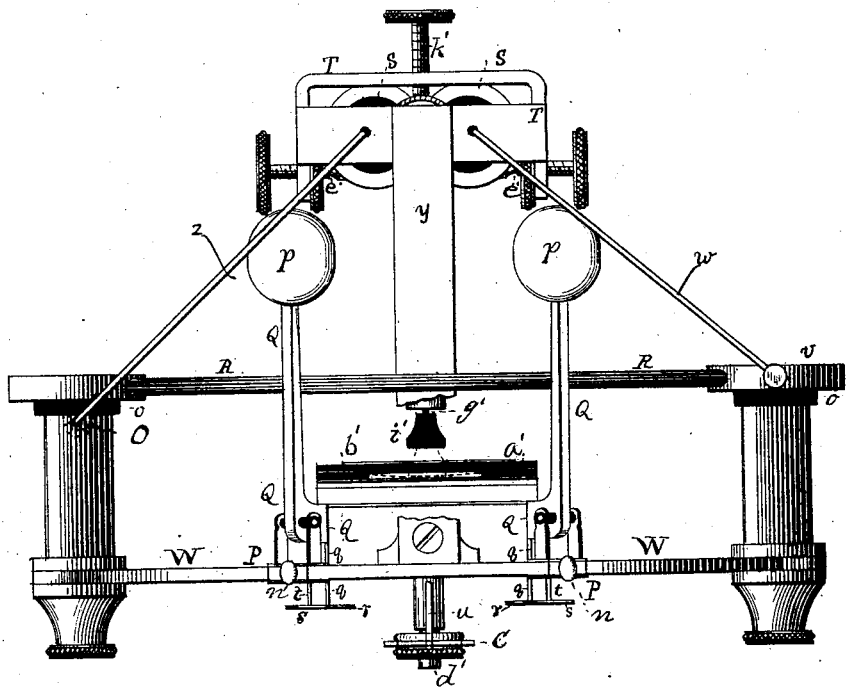
Figure 8:
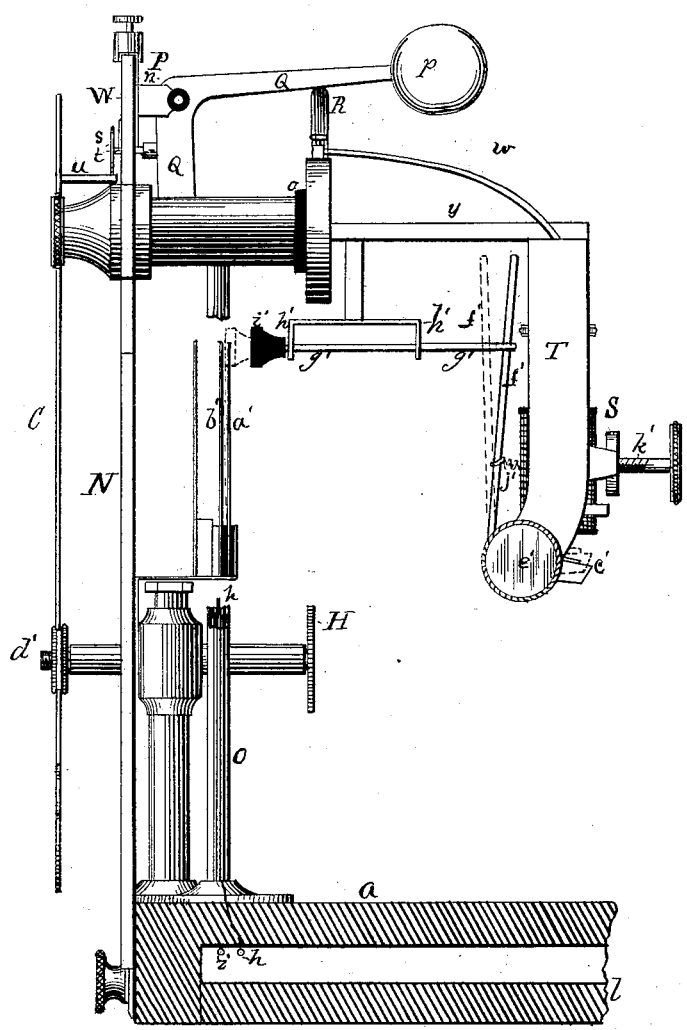

I now proceed to describe the means for bringing the sound-alarm device into action by the receiving thermoscope or thermoscopes, when the prescribed extremes of temperature are reached at the transmitting station or stations, by reference to Figs. 5, 6, 7, and 8 of the drawings, in which Fig. 5 represents a front view of a receiving-thermoscope provided with means for bringing the sound-alarm into action, and in connection therewith the sound-alarm device; Fig. 6, a rear view of the same; Fig. 7, a top view thereof; Fig. 8, a side view of the same. In these views are shown a face-plate, N, which conceals the most of the parts of the receiving-thermoscope, and which may support some of the same, the index-shaft d' corresponding with the index-shaft thus marked in the aforesaid Letters Patent; and upon the said shaft the index C, corresponding to the current index in the said Letters Patent, is mounted, for indicating the true temperature of the transmitting-thermoscope on the arched or concentric scale W, also lettered as in the former Letters Patent. This face-plate N is removably secured to the shelf a, on which it rests. The scale W is represented as, and is preferably, supported at its ends by two tubular standards or posts, O O, secured to the shelf a, above referred to. Upon the arched scale W, concentric with the operating-shaft d' of the thermoscope, are adjustably secured, by screw-clamps n n or otherwise, two extreme-temperature circuit-closers, P P, for bringing the alarm device into action when the said extremes of temperature are reached at the transmitting-thermoscope. These circuit-closers are readily adjustable upon the index-plate by loosening the clamp-screw and sliding the clamp along the plate to the desired degree of temperature and then tightening the clamp-screw again for each circuit-closer, so that the alarm device may be brought into action at any degree desired, which may be changed at will, the index itself closing the circuit by which the alarm device is brought into action when it reaches the required degree on the scale.

I have in the drawings shown one circuit-closer adjusted to 100° Fahrenheit for the highest extreme, and 40° Fahrenheit the point at which the other circuit-closer is adjusted for the lowest extreme—such, for instance, as may be desired for a green-house. The construction of these circuit-closers is peculiar, and is substantially as follows: A short distance to the rear of the scale-plate W is located a bar or rod, R, of corresponding arched shape to that of the scale-plate itself and substantially parallel therewith. This arched bar is of metal or a good conductor of electricity, and forms part of the local-battery circuit by which the sound-alarm is to be brought into action by the thermoscope, and it is insulated from its supports, as indicated at o o, Figs. 6, 7, and 8, by means of gutta-percha or india-rubber blocks, sleeves, or washers, or equivalent means. There is mounted on and pivoted to each screw-clamp n of the circuit-closers and insulated therefrom a bent rod, Q, which rests by its backwardly-extended horizontal part upon the arched bar R, there being a weight, $p$, at the rear end thereof, if necessary, and as heavy as required, to insure a certain metallic contact between the rod and bar for conveying an electric current. The forward arm of the rod is turned downward, preferably, back of the scale-plate and reaching below it, and an arm, $q$, projects forward therefrom beneath the scale-plate, and carries on its forward end a very light hair-spring, $r$, preferably of spiral form or of equivalent shape, by which, while it retains its proper position at all times, it may be moved aside a little by an extremely minute force, the arrangement being substantially as shown in Fig. 5. Just above the spring $r$, but not in contact therewith, and preferably in the same plane, is another very light coiled or spiral hair-spring, $s$, of like construction, mounted at its inner end upon an arm or pin, $t$, projecting forward from the scale-plate W and in metallic contact therewith. The adjacent edges of these two coiled springs are at a little distance apart, so that a small wire or metallic pin passing in between them will come in contact with both springs simultaneously, and thereby make metallic connection between the two springs and close an electric circuit between the scale-plate and the arched bar. Then projecting from the rear side of the thermoscope-index C is a pin or stud, $u$, so located in position thereon that when the index is brought centrally opposite to either circuit-closer the said pin will come in between the two spiral springs thereof in contact with both, and thus close the circuit in which the two springs are situated, and thereby sound the alarm, indicating that that limit of temperature has been reached. The extreme lightness of these springs causes them to yield to the contact-pin $u$ and to press against it on opposite sides without offering any considerable resistance to the movement of the thermoscope-index, which is thus made the instrument for sounding the alarm.

From some part of the arched bar R, or in metallic connection therewith, as the binding-post $v$, a wire, $w$, extends to and forms metallic connection with the wires of an electro-magnet, S, mounted in a frame, T, suspended from an arm, $y$, projecting backward from the face-plate N of the thermoscope, or otherwise suitably supported. It is by means of this electro-magnet, when a current of electricity is passed through it from the battery L, Fig. 2, that the circuit of the alarm-battery M, same figure, is closed and the alarm-bell sounded thereby. The remainder of the circuit back to the battery L is from the other side of the electro-magnet S, through a wire, $z$, leading most conveniently to one of the standards O, supporting the scale of the thermoscope, thence down through the said post, but insulated therefrom, and thence by the wire $h$, Figs. 2, 4, and 8, to the battery.

Figure 23:
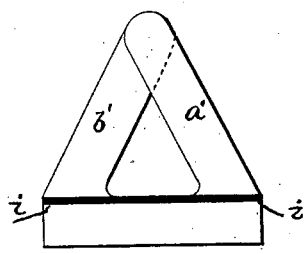

Now, the device for closing the alarm-circuit by the action of the electro-magnet S is substantially as follows: In any proper position—suitably a little back of the face-plate N, as shown in Fig. 8—are secured to a suitable support, and insulated therefrom and from each other, two metallic strips or plates, $a'\ b'$, crossing each other, as shown in Fig. 23, and at a very little distance apart, one plate, $a'$, at least being thin and flexible, so that it may, with little pressure applied to its rear side, be brought into contact with the other plate. These two plates are respectively in metallic connection with two portions, $i\ i$, as shown in Figs. 8 and 23, of the circuit-wire of the alarm-battery M, so that when the plates are separated the circuit is broken and when they are brought into contact with each other the circuit is closed, and the alarm-bell continues to be sounded as long as the two plates remain in contact, or as long as the index-pin keeps the circuit closed between the spiral springs. To bring these two contact-plates together, and thereby sound the alarm-bell, one (or both) of the plates is made very thin and elastic or otherwise equivalently constructed, so that a slight pressure brought against it will move it into contact with the other plate, and when the pressure against it is removed it will spring back out of contact with the other plate and again break the circuit and stop the ringing of the alarm-bell. The two plates, as shown, especially in Fig. 23, are secured at their lower ends to their insulated support, and are situated quite near together, their upper ends crossing each other and presenting the general form of an inverted letter V, as shown most clearly in the said Fig. 23. The rear plate is moved forward to make contact with the forward plate by substantially the following means: The electro-magnet S has an armature, $c'$, below its poles, at the lower end thereof, the armature being pivoted at $e'\ e'$ to the supporting bracket or frame. From the forward vibrating side or arm of the armature a rod, $f'$, Fig. 8, extends upward, and from the upper end or part of this rod a sliding rod or bar, $g'$, reaches forward and reaches close to the upper or free end of the rear contact-plate, the sliding rod or bar being mounted in bearings or supports $h'\ h'$, supported by the bracket-arm of the thermoscope. The forward end of the sliding rod or bar $g'$ is tipped with gutta-percha, india-rubber, or other electric non-conducting material, $i'$, so that when it touches the contact-plate $a'$ there will be no shunting of the electrical current out of its proper circuit. The arrangement of the rods $f'$ and $g'$ in relation to the magnet and contact-plates is such that when the magnet becomes magnetized by the closing of the circuit of the local battery L, as above specified, the rod $f'$ on the armature $c'$ is raised and the rod $g'$ is slid forward, bringing its tip $i$ against the rear contact-plate and pushing it forward into contact with the other contact-plate, thereby closing the alarm-circuit and sounding the alarm-bell; and when the circuit of the battery L becomes broken, as set forth above, the magnet S becomes demagnetized again, when a retracting-spring, $j'$, or its equivalent, will draw the sliding rod $g'$ back again, thus allowing the rear contact-plate to separate from the other contact-plate, thereby breaking the alarm-battery circuit and stopping the ringing of the alarm-bell. The force of retraction produced by the spring $j'$ may be regulated by a set-screw, $k'$, connected with the rods $f'$ or $g'$ by the said spring.

In carrying out the detailed construction of the above circuit-closing device any equivalent of the various parts known to mechanics may be employed, as will be readily understood by those skilled in the art.

To avoid an unnecessarily-continued ringing of the alarm-bell at any time, the alarm-circuit may be broken by drawing out the circuit-closing knob $d$. (Shown in Figs. 1 and 21.) As this device is a simple and effectual circuit closer and breaker, I have shown its construction in the said detail views. A rigid metallic plate, $l'$, is attached to the wood of the shelf or support $m'$, which is or should be a non-conductor of electricity. A thin elastic or otherwise movable plate, $n'$, is also secured to the shelf or support. These two metallic plates are respectively in metallic connection with two parts, $i\ i$, of the alarm-battery circuit-wire, so that by bringing the two plates into contact with each other the circuit will be closed, so far as this part of the same is concerned, and when they are separated the circuit will be broken in any case. A push-rod, $o'$, with the knob $d$, is made to push the plate $n'$ into contact with the plate $l'$, and it is held in that position by a shouldered feather, $p'$, on the rod bearing against the outer side of the holder, when the rod is turned to one position, as shown at the left hand in Fig. 21 and by dotted lines in Fig. 22. A coiled spring, $q'$, acts to throw the bolt forward and separate the plates $l'\ n'$ when the bolt is turned round to a position to allow the shouldered feather to pass through an aperture in the holder for the purpose, as shown at the right hand in Fig. 21 and by full lines in Fig. 22.

Figure 9:
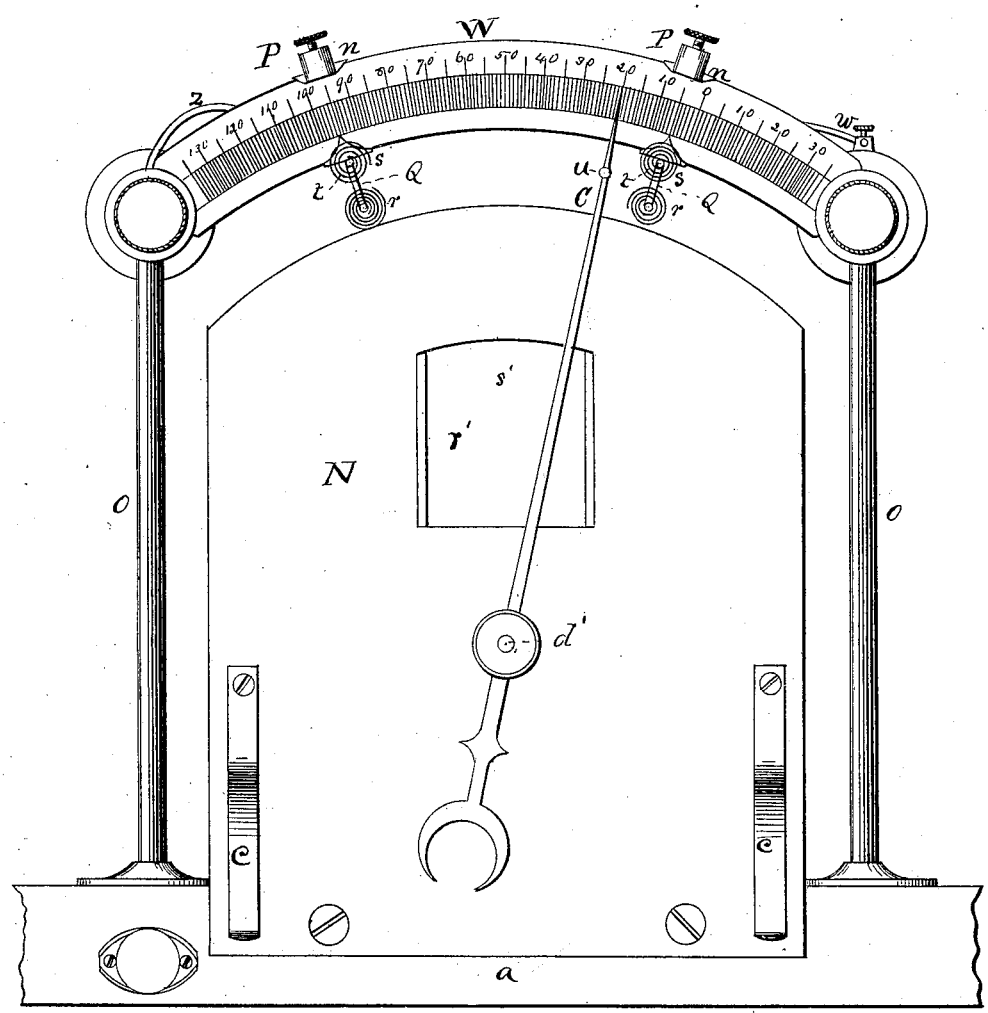
Figure 10:
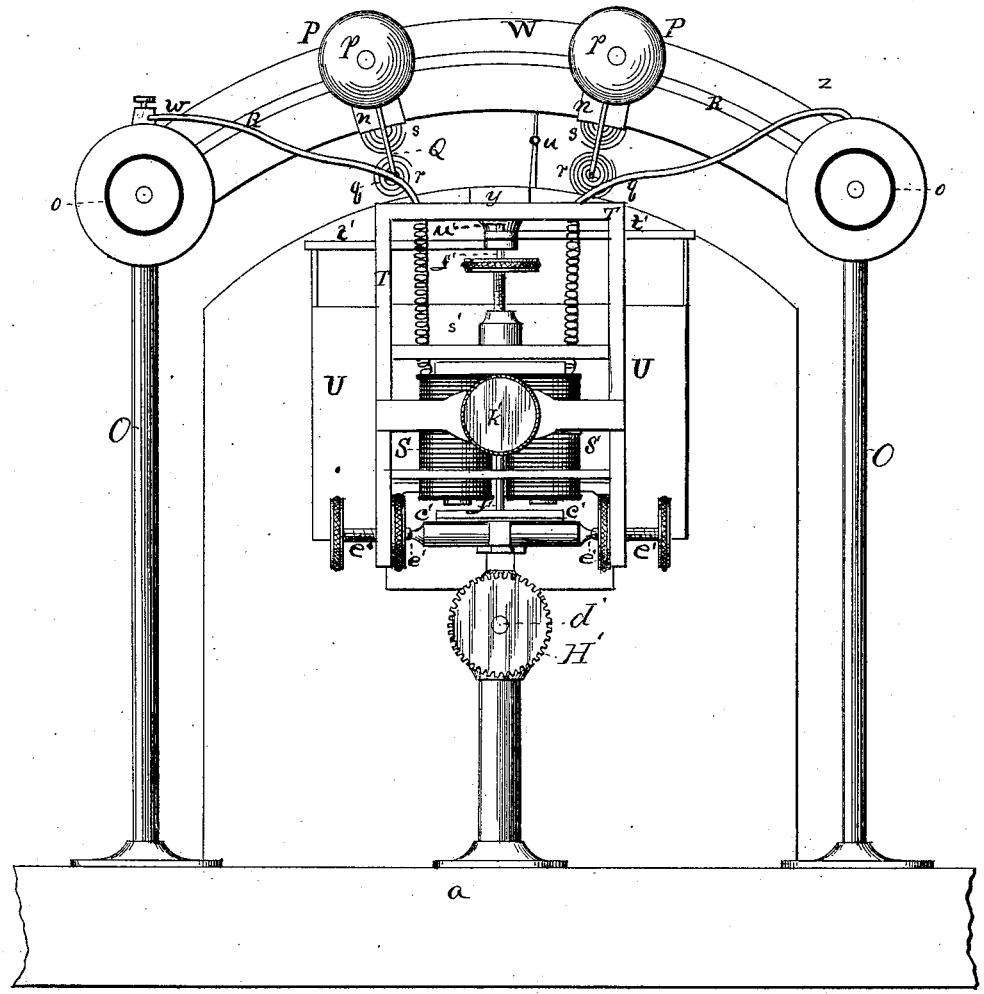
Figure 11:
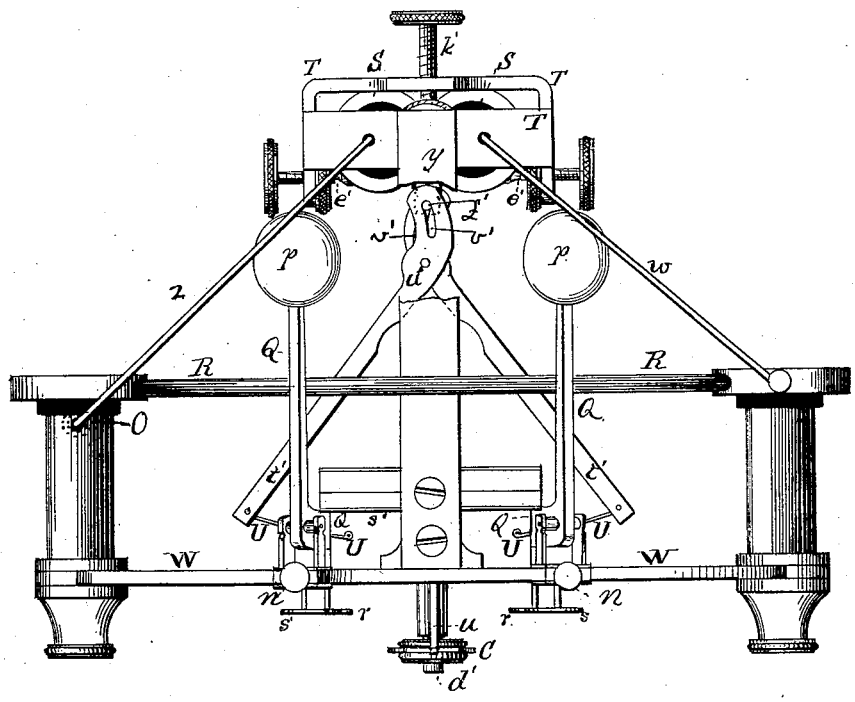
Figure 12:
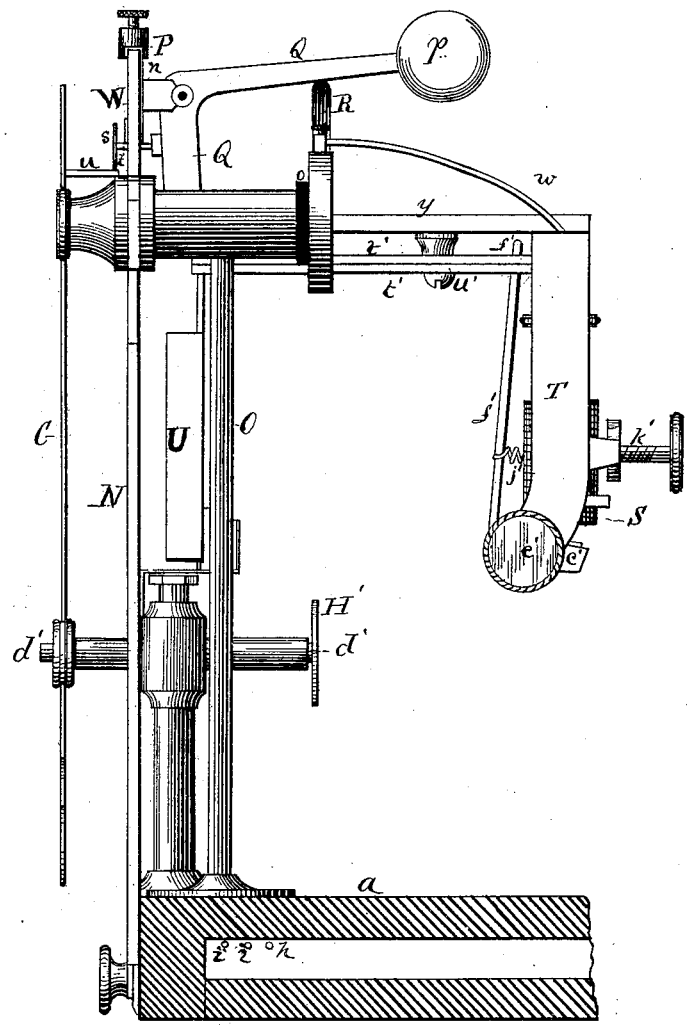

For means to carry out my sight-signaling device, in combination with a receiving-thermoscope, reference is now made to Figs. 9, 10, 11, and 12 of the drawings. In these views Fig. 9 represents a front view of a receiving-thermoscope provided with a sight-signaling device; Fig. 10, a rear view of the same; Fig. 11, a top view thereof; Fig. 12, a side view of the same. In these views, also, I have omitted the operative works of the thermoscope proper, except that I show the worm-wheel H′ and index-shaft $d'$, designated by the same letters of reference in the aforementioned Letters Patent for an electro-magnetic thermoscope. For the purpose of sight-signaling in connection with the thermoscope only one local battery is required, which may correspond exactly with the local battery L for the sound-alarm device, and is marked by the same letter of reference in the present case; also, exactly similar circuit-closers P P, for high and low extremes of temperature, are or may be used, to be brought into action by a pin on the index C of the thermoscope in just the same way as above described. The circuit-closing arm, constructed and operating as in the former Letters Patent above referred to, rests on a similar arched bar, R, at the rear of the scale-plate W and parallel therewith, all substantially as before described in the sound-alarm apparatus, and the local-battery circuit is completed in the same way through an electro-magnet, S, also arranged and operating in the same way as in the sound-alarm device. All the parts thus corresponding with the sound-alarm device are designated by like letters in the drawings.

The sight-signal device proper is constructed and operated in connection with the local battery, circuit-connections, and thermoscope-index, as above set forth, as follows: In the face-plate N of the thermoscope is an opening, $r'$, of the shape shown in Fig. 9, or other suitable form. This aperture is large enough to enable a signal to be seen through it at the farthest required distance. A little way back of the aperture is located a separate screen-plate, $s'$, for concealing parts beyond it, and before it is to be displayed the sight-signal. It may be made of the same material as the face-plate of the thermoscope, or have a similar surface, for more clearly distinguishing the signal when brought into view through the aperture $r'$. For the sight-signal itself I represent two movable plates, U U, located at the opposite sides of the aperture, so as to be capable of being moved toward each other, for displaying them through the aperture, or away from each other, out of sight, behind the face-plate at the sides of the aperture. The front surfaces of these signal-plates may be of a bright color, or otherwise marked to contrast clearly and sharply with the surface of the face-plate of the thermoscope and the screen-plate behind. The remainder of the signaling device consists in means by which the signal-plates are exposed to view through the aperture $r'$, or withdrawn from sight on closing or breaking the local-battery circuit, as the case may be. These signal-plates are respectively suspended from or attached to two horizontal swinging arms or levers, $t'\ t'$, swinging on a vertical pivot, $u'$, and extending back to a position over the vertical rod $f'$ in front of the electro-magnet S, where they cross each other. At this point there are longitudinal slots $v'\ v'$ through the arms, as shown in Fig. 11, through which projects the said vertical rod $f'$, projecting up from the armature $c'$ of the electro-magnet. The construction and mutual arrangement of all these parts are such that when the armature is raised by the magnetized electro-magnet the upper end of the rod $f'$ is swung forward and caused to traverse the slots $v'\ v'$ in the arms $t'\ t'$, the inclination of which slots is such that this forward movement of the said rod causes the forward ends of the arms to move toward each other sufficiently to bring the signal-plates together, or to bring them into view through the aperture in the face-plate of the thermoscope, and when the electro-magnet S becomes again demagnetized by the breaking of the signal-battery circuit, on account of the index-pin of the thermoscope passing away from the spiral springs of the circuit-closer, a retracting-spring, $j'$, or its equivalent, brings back the armature-rod $f'$ to its former position, and thereby separates the signal-plates and conceals them behind the face-plate of the thermoscope.

From the above description of the sound-alarm and signal devices it is obvious that both may be combined in one receiving-thermoscope and may operate simultaneously and in harmony and with very slight complexity of mechanism over that for either separate, since nearly identical devices may be used for both, except as to the mere ultimate function of each device. Thus the actuating local battery, the circuit-connections, and means for the closing of the battery-circuit may be the same, and only one of each part will suffice for both purposes together; and, further, the same and a single electro-magnet, S, a single armature, $c'$, and armature-rod $f'$, with the retracting-spring $j'$ thereof, as referred to in each of the devices relating thereto above, may be used for both devices operating together. In many cases it is desirable to have both devices in each thermoscope.

Figure 13:
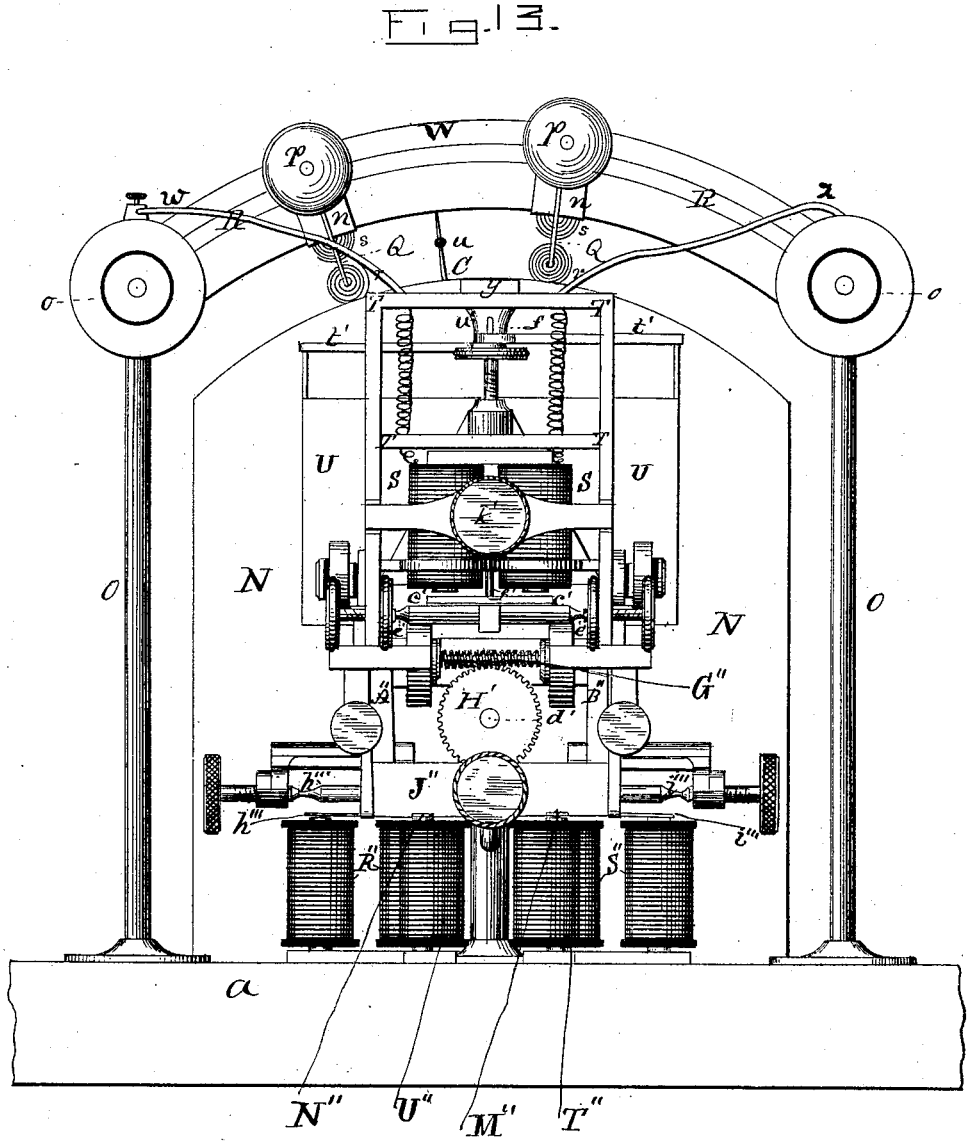
Figure 14:
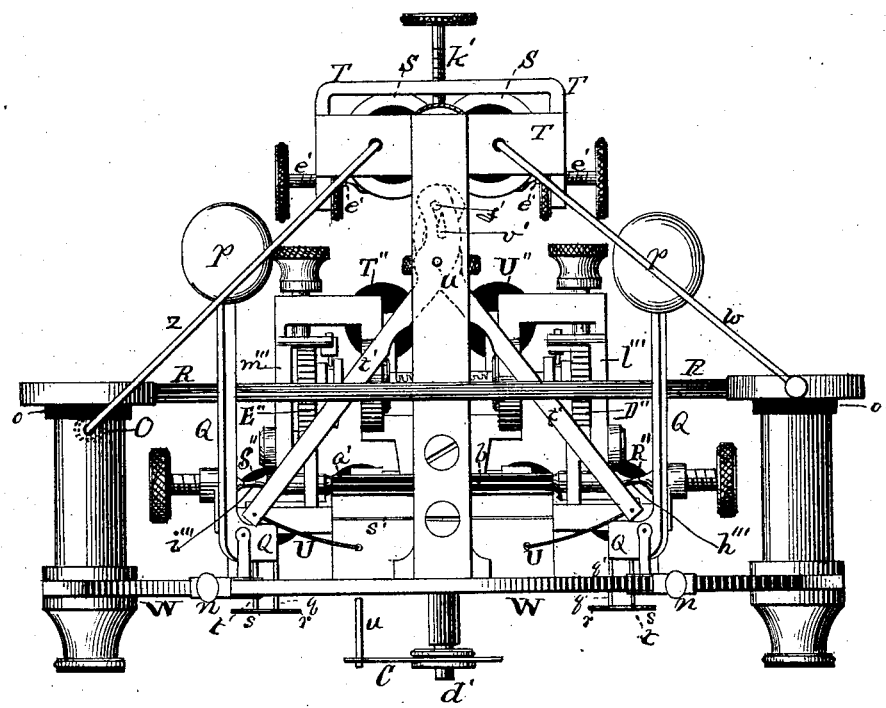
Figure 15:
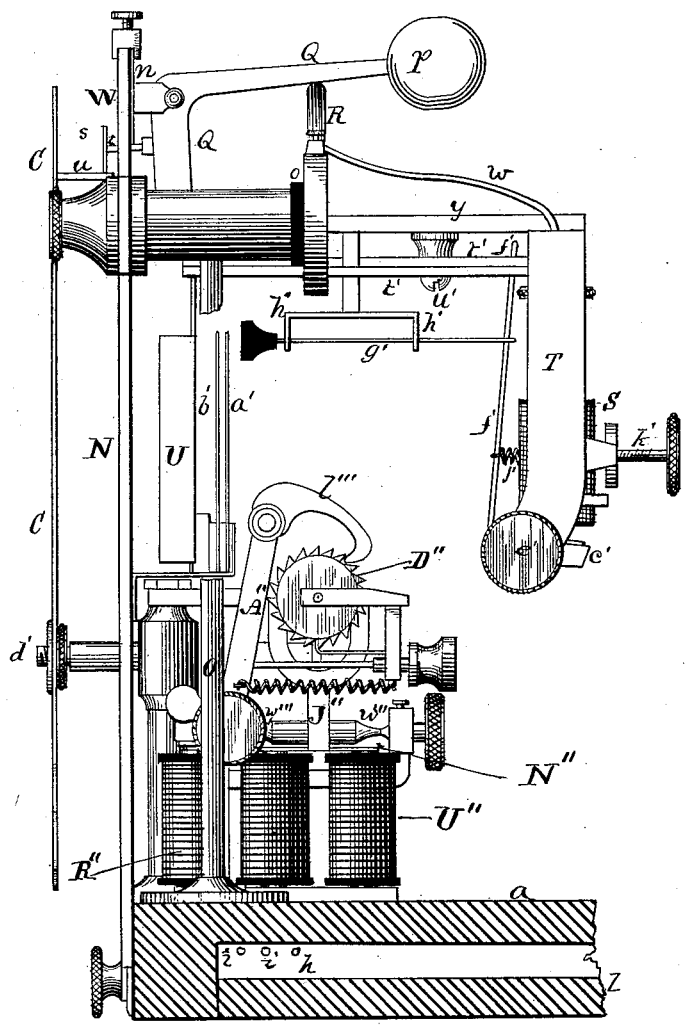

In order to show definitely how the two devices may be united as one, I thus represent in Figs. 13, 14, and 15 a thermoscope provided with both devices completely and operating in harmony together. Fig. 13 represents a rear view of the apparatus; Fig. 14, a top view of the same, and Fig. 15 a side view thereof. The parts represented by the same letters of reference correspond with the like parts in each of the devices, before shown and described separately, and fulfill the functions of both simultaneously, so that it will be seen how completely and perfectly the two devices work together with duplication of corresponding parts. I also represent in these figures the operative parts proper of the receiving-thermoscope itself, the said parts being identical with the construction shown in the Letters Patent before referred to in this specification, and therefore not requiring special description here, it being sufficient to refer to the main parts thereof, as follows:

For actuating the index, the increasing-temperature magnet B″, decreasing-temperature magnet S″, their respective armatures $h'''$ $i'''$, mounted on one end of the respective bell-crank levers A″ B″, vibrating on pivots $j'''$ $k'''$ and carrying, respectively, pawls $l'''$ $m'''$, which engage with the respective ratchet-wheels D″ E″ upon the worm-shaft G″, that gears into the worm-wheel H′ on the index-shaft $d'$, and for alternately clutching the ratchet-wheels D″ E″ to the worm-shaft G″, and the electro-magnets T″ U″, respectively, in the increasing-temperature and decreasing-temperature circuits, their armatures M″ N, attached to the opposite ends of an armature-lever, J″, vibrating on pivots $w'''$ $w'''$, and operating the clutches of the said ratchet-wheels by its vibrations, are all just as set forth in the before-mentioned Letters Patent.

In cases where the sound-alarm and sight-signal devices are united in one thermoscope, it may be at times advisable or desirable not to use the sound-alarm, even when, at other times, both may be desirable—as, for instance, in the day-time the sound-alarm may be preferably dispensed with, whereas at night it may be very desirable, as well as the sight-signal. For adapting the combined instrument to this purpose, the sound-alarm battery-circuit $i$ is provided with a circuit breaker and closer, (shown in Figs. 21 and 22 and above described,) so that the alarm device may be cut out by hand at any time and again restored to action, as required.

Figs. 16, 17, 18, 19, and 20 represent various views of a receiving-thermoscope provided with a temperature-recording device actuated or controlled by the thermoscope. In these views, Fig. 16 represents a front view of the thermoscope; Fig. 17, a rear view of the same, showing so much of the thermoscope movement only as is required to show the connection of the recording device therewith and the means by which the said device is controlled thereby; Fig. 18, a top view of the recording device and its operating-gear; Fig. 19, a central vertical section through the face-plate of the thermoscope, showing the means by which the movement of the thermoscope actuates the recording device, in connection with a clock-movement for regularly moving the paper on which the temperature is recorded; Fig. 20, a side view of the main parts of the recording device, together with the upper part of the thermoscope; Fig. 21, a view showing a device for closing and breaking the alarm-bell electric circuit, the device being shown in plan as arranged in a part of the case shown in section; Fig. 22, a front view of the device, the push-rod being in section; Fig. 23, a separate view of the self-acting circuit-closing plates for the electric circuit.

For the purpose of this device I employ a tablet strip or roll, $A^4$, of paper or proper material of sufficient width to have ruled thereon longitudinal lines in a series to form a scale for all the degrees of temperature ever required to be recorded thereon and as long as convenience may dictate. The tablet-roll is mounted on any convenient part of the thermoscope where a slow and uniform longitudinal motion may be imparted thereto. I have shown it mounted longitudinally across the upper part of the instrument on two vertical rollers, $a''$ $b''$, so that it may be unrolled from one and at the same time rolled upon the other, and the portion exposed between the rollers be kept smooth and slightly taut. These rollers are removable from their shafts or spindles. As shown in the drawings, the tablet-roll is first wound upon the passive roller $a''$ at one side of the thermoscope and then gradually unwound therefrom by winding it upon the active roller $b''$, at the opposite side of the thermoscope. In order to give this roller $b''$ a uniform slowly-revolving motion for moving the tablet-roll regularly along, I have shown in the drawings the following construction:

A cog-wheel, $c''$, on the lower end of the roller or its shaft gears into another cog-wheel, $d''$, on a vertical shaft, $e''$, which extends downward, preferably through one of the hollow standards O, which support other parts of the thermoscope devices, as before specified. The base of this standard is enlarged, as at $f''$, and made hollow and broken or cut away sufficiently at one side to allow a suitable connection to be made between the said shaft and the power which is to drive it. This power is a clock-movement, B', (shown in outline in Figs. 16 and 17,) and a belt, $g''$, passes from a pulley, $h''$, on the said vertical shaft to a pulley, $i''$, on the center staff or shaft of the clock, all as shown, or in any equivalent manner. By this construction, as the said shaft of the clock slowly revolves, a slow and uniform movement of the tablet-roll from right to left is produced thereby. A cross-scale on the tablet-roll marks the hours and divisions of the hours of the passing time. The tablet-roll is adjusted so that the marking of the hours and parts of hours thereon shall indicate the true time at a vertical line, $j''$, on the thermoscope, along which line a pencil, pen, or other marker, C', is adapted to move, as shown in Fig. 16. This marker slides vertically on a guide rod or way, $k''$, suitably mounted just in front of the tablet-roll, as shown, or otherwise, with similar effect. A light coiled spring, $l''$, or its equivalent, such as a counter-weight, is arranged to raise the marker when the opposite movement of the same is not in action. This opposite movement is effected by the current-temperature index C of the thermoscope, so as to record the exact temperature, as indicated by the said thermoscope, continually upon the surface of the tablet-roll. The construction for the purpose is as follows:

From the marker C' a small cord, chain, or band, $m''$, extends downward to the index-shaft $d'$ of the thermoscope, and is wound upon a pulley or drum, $n''$, on the said index-shaft. It is wound one or more turns around the said pulley or drum and in order that the coils thereof may be kept exactly in place, and not interfere with one another, it is best to make a slight spiral groove around the periphery of the pulley or drum, as shown in Fig. 19. The entire arrangement is such that when the thermoscope-index moves toward the rising-temperature end of the thermoscopic scale it winds the connecting cord or chain on the pulley or drum, thereby drawing the marker downward and correspondingly recording a line on the tablet-roll to the temperature indication of the thermoscopic index and scale, and as the thermoscopic index moves toward the falling-temperature end of the thermoscopic scale the connecting cord or chain is correspondingly unwound from the pulley or drum of the index-shaft, so that the marker is then raised by the action of the counter-spring. Of course the rate of this winding and unwinding movement of the connecting cord or chain is arranged to exactly correspond with the marked degrees or lines on the tablet-roll. Immediately back of the tablet-roll is a vertical plane back plate or surface, $o''$, against which the tablet-roll bears where the marker bears on the tablet-roll. and the marker is adjusted by a screw, as shown in Fig. 20, or its equivalent, and may have an elastic pressure against the tablet-roll sufficient to insure a legible marking thereon. It is obvious that the marking movement may be the reverse in its indications to that shown and above described, so that the rising temperature may be indicated by the upward movement of the marker, and vice versa.

For convenience, instead of marking the degrees of temperature at different places on the tablet-roll, a permanent scale or scales, D' D', will be used, being located just outside of the rollers on which the tablet-roll is wound, the index-lines on this scale or scales corresponding in height and distance apart with the lines on the tablet-roll. These scales are conveniently formed as upward projections from the frame-work supporting the marking device, as shown in Figs. 16 and 17. The pulley or drum on the index-shaft of the thermoscope should be mounted loose upon the shaft, so as to be capable of turning thereon, and a screw or other clutch, $p''$, be employed to couple it to the shaft. This is for the purpose of adjusting the position of the tablet-roll to the marker in connection with the thermoscopic index. The central temperature-line of the tablet-roll may be either marked zero, if for recording the atmospheric temperature, or, if for special indoor or other use where the temperature is subject to regulation, it may be the medium temperature desired.

Figure 24:
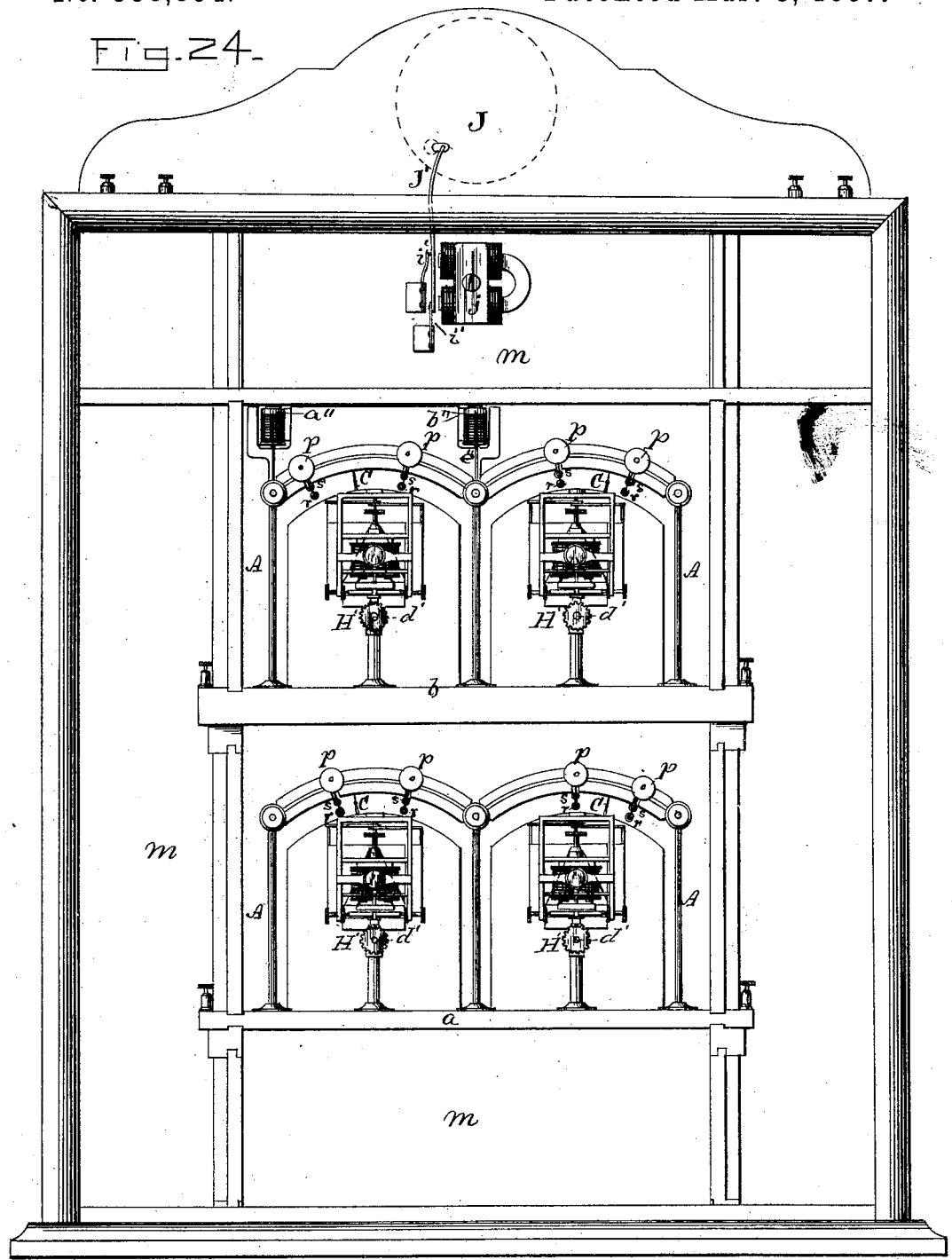

In Fig. 24 I show in one general rear view four receiving-thermoscopes arranged in one case, all equipped with both sound-alarms and sight-signals, and one only showing the main parts of a temperature-recording device. I do not in this device show the thermoscopic movements, except the index-shaft $d'$ and worm-wheel H', by which it is rotated. I show a single local battery for the sight-signal and sound-alarm work, and wires connecting the same with the four instruments, to illustrate how one local battery may serve for an indefinite number of such thermoscopes. I also show only one alarm-bell and one alarm-battery, to illustrate how one of each suffices for any number of instruments. The wires of corresponding function are all marked with like letters of reference, and it is readily seen how one battery has connections with each of the instruments, so as to close the circuit through either alone whenever its temperature-index closes that part of the circuit, and neither of the other instruments will have its circuit closed thereby, either as to the local battery or the alarm-battery. The arrows by the side of the wires and along other parts of the local circuits indicate the directions of the battery-currents along the same. The main parts of all the circuit-wires are shown as located in the marginal passages or chambers of the case, as before set forth, and portions thereof extend beneath the shelves which support the thermoscopes, to reach the proper parts of the several instruments from the marginal passages, while, also, parts of the local-battery wires extend through one of each of the hollow standards belonging to the several instruments, the said parts being insulated from the said standards.

I claim as my invention—

1. In combination with an electro-magnetic receiving-thermoscope which indicates the temperature of a distant room or place, a sound-alarm device brought into action by the said receiving-thermoscope at a predetermined degree of high or low temperature reached by the indicator of the thermoscope, as herein set forth.

2. In combination with an electro-magnetic receiving-thermoscope which indicates the temperature of a distant room or place, a sight-signal device brought into action by the said receiving-thermoscope at a predetermined degree of high or low temperature reached by the indicator of the thermoscope, as herein set forth.

3. In combination with an electro-magnetic receiving-thermoscope which indicates the temperature of a distant room or place, an automatic temperature-recording device actuated or controlled by the said receiving-thermoscope, as herein set forth.

4. In combination with an electro-magnetic receiving-thermoscope which indicates the temperature of a distant room or place, a sound-alarm device and a sight-signal device, both brought into action by the said receiving-thermoscope at a predetermined degree of high or low temperature reached by the indicator of the thermoscope, as herein set forth.

5. In combination with an electro-magnetic receiving-thermoscope which indicates the temperature of a distant room or place, a sound-alarm device and a sight-signal device, both brought into action by the said receiving-thermoscope at a predetermined degree of high or low temperature reached by the indicator of the thermoscope, and an automatic temperature-recording device actuated or controlled by the thermoscope, as herein set forth.

6. The combination, in one frame or case, of two or more electro-magnetic receiving-thermoscopes which indicate the temperature of two or more distant rooms or places, an alarm-bell sounded by a battery, one or more sound-alarm devices, and one or more sight-signal devices brought into action by one or more of the receiving-thermoscopes at predetermined degrees of high or low temperature reached by the indicators of the thermoscopes, as herein specified.

7. The combination, in one frame or case, of two or more electro-magnetic receiving-thermoscopes which indicate the temperature of two or more distant rooms or places, an electrically-sounded alarm-bell, one or more sound-alarm devices, and one or more sight-signal devices brought into action by one or more of the receiving-thermoscopes at predetermined degrees of high or low temperature reached by the indicators of the thermoscopes, and one or more temperature-recording devices actuated or controlled by one or more of the thermoscopes, as herein specified.

8. A case in which two or more electro-magnetic receiving-thermoscopes which indicate the temperature of distant rooms or places are mounted, having central compartments in which the said thermoscopes are located, suitable shelves or supports, and marginal compartments in which the connecting-wires that conduct the several electric currents for the thermoscopes are located, the said compartments being accessible from the outside by one or more doors, as herein set forth.

9. The combination, with the increasing and decreasing temperature-wires, of the light coiled springs $r$ $s$ and the thermoscope-index C, provided with a pin or projection, $u$, forming an electric circuit-closing device, substantially as herein specified.

10. In combination with the increasing and decreasing temperature circuit-wires of an electro-magnetic thermoscope and the thermoscopic index, the arched scale W and the circuit-closers P P, adjustable thereon, substantially as and for the purpose herein specified.

11. The combination of the arched scale W, forming part of an electric circuit, the adjustable circuit-closers P P, each provided with a pivoted rod, Q, and the arched bar R, forming part of the same electric circuit and insulated from the said arched scale, substantially as and for the purpose herein specified.

12. The combination of the electro-magnet S, the arched scale W, in the same electric circuit therewith, and the arched bar R, the armature of the said electro-magnet having a rod, $f'$, projecting therefrom, a slide-rod, $g'$, moved by the rod $f'$, and the two contact-plates $a'$ $b'$, for closing the circuit of the alarm-bell battery, substantially as and for the purpose herein specified.

13. The combination of an alarm-bell, galvanic battery actuating the bell-sounder, the two contact-plates $a'$ $b'$, situated in the circuit of the alarm-bell battery and located near but insulated from each other, one of which plates is movable, and means, as the slide-rod $g'$, for moving one plate into and out of contact with the other, substantially as and for the purpose herein specified.

14. The combination of the face-plate of a thermoscope having a signal-opening therein, a shield-plate back of the said opening, and a signal plate or plates, U U, adapted to be moved into position in front of the shield-plate, substantially as and for the purpose herein specified.

15. The combination of an electro-magnet, S, in the electric circuit, which is broken and closed by the thermoscope temperature-index, the signal plate or plates U U, arms $t'$ $t'$, by which the signal-plates are moved, and means, as the armature $c'$ and rod $f'$, whereby the said arms of the signal-plates are actuated by the said electro-magnet to bring the signal-plates into view, substantially as herein set forth.

16. The combination of the single electro-magnet S, armature $c'$, rod $f'$, slide-rod $g'$, contact-plates $a'$ $b'$, swinging arms $t'$ $t'$, and signal-plates U U, substantially as and for the purposes herein specified.

17. The combination of one or more electro-magnetic receiving-thermoscopes, one or more sight-signal devices, and one or more sound-alarm devices brought into action by the temperature index or indexes of the said thermoscope or thermoscopes, a local battery and circuit for sounding an alarm-bell, a local battery and circuit for closing the circuit of the alarm-battery and for bringing into action the sight-signal device or devices, and a key or hand circuit closer and breaker, whereby the sight signal or signals and the sound-alarm may be actuated together or the sight signal or signals alone, as herein set forth.

18. The combination of an electro-magnetic receiving-thermoscope, a tablet-roll mounted on the said thermoscope and adapted to have a continuous movement in one direction, a clock-movement for moving the tablet-roll, a marker having a movement across the tablet-roll in front of the same, and a cord or its equivalent connecting the marker and a pulley or drum on the index-shaft of the thermoscope, as herein set forth.

19. The combination of the scale, index, and increasing and decreasing temperature circuit-wires of an electro-magnetic thermoscope, the tablet-roll, the winding and unwinding rollers $a''$ $b''$, shaft $e''$, geared to the winding-shaft $b''$, clock-movement B', and belt $g''$, passing from a pulley on the center shaft of the clock to a pulley on the said shaft $e''$, substantially as and for the purpose herein specified.

20. The combination of the scale, index, increasing and decreasing temperature circuit-wires and battery of an electro-magnetic receiving-thermoscope, a tablet-roll adapted to have a longitudinal movement and having numbered time-scale cross-lines and temperature-scale longitudinal lines thereon, clock-work adapted to impart a longitudinal movement to the said tablet-roll, and a marker having a movement transversely over the tablet-roll, and actuated by the index of the thermoscope, substantially as and for the purpose herein specified.

21. The combination of the scale, index, increasing and decreasing temperature circuit-wires of an electro-magnetic receiving-thermoscope, a tablet-roll adapted to have a longitudinal movement and having longitudinal temperature-lines marked thereon, one or more separate numbered temperature-scales at the end or ends of the moving roll, clock-work adapted to impart a longitudinal motion to the said tablet-roll, and a marker having a transverse movement over the tablet-roll and actuated by the index of the thermoscope, substantially as and for the purpose herein set forth.

22. The combination, in an electro-magnetic receiving-thermoscope, of the index and index-shaft of the said thermoscope, a tablet-roll having a longitudinal movement, a marker adapted to have a transverse movement over the tablet-roll, a pulley or drum coupled to the index-shaft, and a cord winding upon the said index-pulley and connecting the said pulley and the marker, substantially as and for the purpose herein set forth.

HENRY J. HAIGHT.

Witnesses:
C. S. NEWELL,
GIDEON E. MOORE.